Nov. 7, 1939.   F. M. SMALL   2,178,817
INTERIOR PANELING AND METHOD OF ERECTING THE SAME
Filed Oct. 17, 1936   7 Sheets-Sheet 1

Inventor
Frederick M. Small
By Baron + Thomas
Attorneys

Nov. 7, 1939.   F. M. SMALL   2,178,817
INTERIOR PANELING AND METHOD OF ERECTING THE SAME
Filed Oct. 17, 1936   7 Sheets-Sheet 2

Inventor
Frederick M. Small
By Bacon & Thomas
Attorneys

Nov. 7, 1939.  F. M. SMALL  2,178,817
INTERIOR PANELING AND METHOD OF ERECTING THE SAME
Filed Oct. 17, 1936  7 Sheets-Sheet 4

Inventor
Frederick M. Small
By Bacon & Thomas
Attorneys

Nov. 7, 1939.  F. M. SMALL  2,178,817
INTERIOR PANELING AND METHOD OF ERECTING THE SAME
Filed Oct. 17, 1936  7 Sheets-Sheet 6

Patented Nov. 7, 1939

2,178,817

UNITED STATES PATENT OFFICE

2,178,817

INTERIOR PANELING AND METHOD OF ERECTING THE SAME

Frederick M. Small, York, Pa., assignor to Martin-Parry Corporation, York, Pa., a corporation of Delaware Application October 17, 1936, Serial No. 106,211

20 Claims. (Cl. 189—85)

This invention relates to new and useful improvements in interior paneling and method of erecting the same.

In all systems for applying paneling over existing plastered walls known to me prior to the development of this invention, it has been necessary to anchor the paneling to the ceiling and/or side walls. Wall structures vary considerably in the use of metallic and wooden laths, studs, and furring strips, and brick, terra-cotta and cement underneath the plaster. These structural variations present problems as to the style and type of anchor devices which can be used and the points at which they can be attached to the old walls. These problems must be solved independently for each individual job. The use of wall anchors also requires the expenditure of a great deal of labor which adds materially to the installation cost.

The primary object of my invention is to provide interior paneling and a method of erecting the same which eliminates the necessity of anchoring the paneling to either the ceiling or the side wall, anchorage being made to the floor only in cases when it is desired or easily accomplished.

A further object of the invention is to provide a novel form of panel unit supporting frame which may be applied to and removed from the side walls of a room without altering or defacing the walls in any way.

Still another object of the invention is to provide a system of interior paneling which is extremely inexpensive both as to the cost of materials and cost of installation.

Other objects and advantages of the invention will be apparent during the course of the following description.

In the accompanying drawings forming a part of this specification and in which like numerals are employed to designate like parts throughout the same, Figure 14 is a fragmentary perspective view of a still further modified form of anchorage for the lower ends of side wall furring strips, Figure 15 is a vertical sectional view of the structure shown in Fig. 14.

Figure 1:
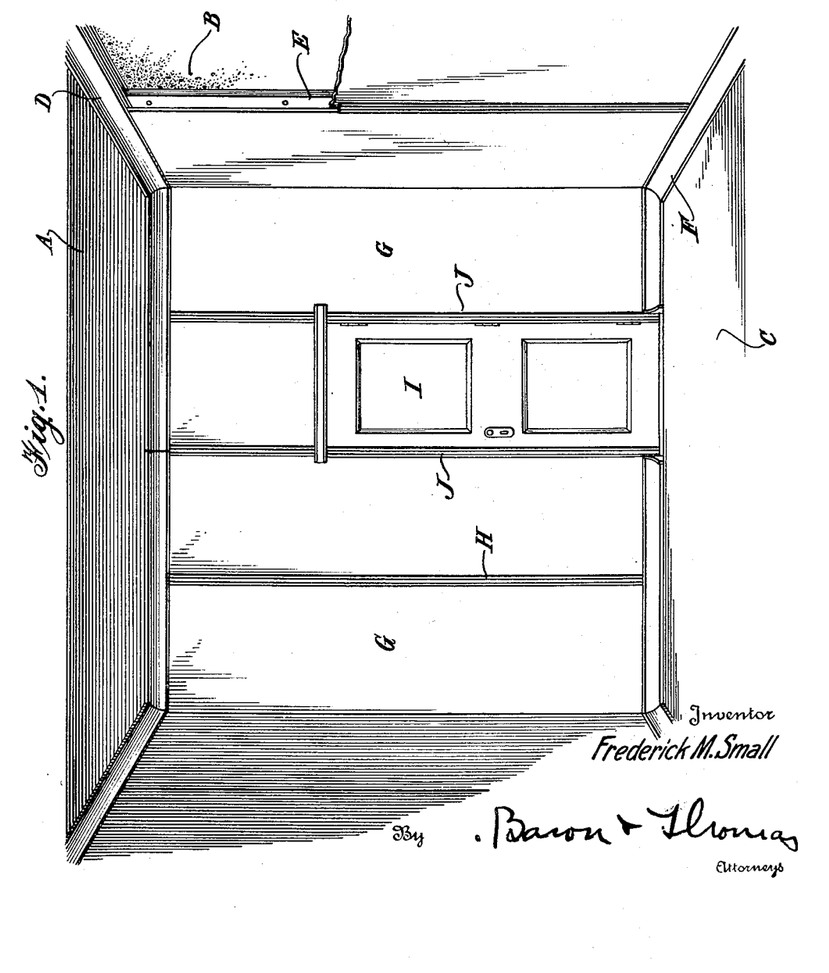
Figure 1 is a fragmentary elevational view of a room to the side walls of which has been applied the interior paneling embodying this invention and in accordance with my novel method.

In the drawings, wherein for the purpose of illustration is shown a preferred embodiment of this invention, and referring particularly to Fig. 1, the reference character A designates the ceiling of a room to be provided with interior paneling. The paneling is to be applied to the side walls of the room which are designated by the reference character B. The floor of the room is designated by the reference character C.

Located in the angle formed by the ceiling A and side walls B is a continuous, channel-shaped frame D which is supported solely by a desired number of uniformly spaced furring studs or strips E which are applied directly to the plastered surface of the side walls B and are unattached thereto. The lower ends of all of the furring studs or strips E are secured by a bottom frame F which, if desired, may be attached to the floor C. The various panel units G are attached to the furring studs or strips along their vertical edges by means of moulding devices H. The horizontal edges of the panel units G, when they approach the ceiling A and floor C are suitably attached to the top and bottom frames D and F, respectively.

The reference character I designates a door which closes an opening formed in one wall of the room disclosed in Fig. 1. The door frame is covered or finished on the paneled side of the room by means of a moulding J.

Figs. 3 to 8, inclusive, disclose in detail the structural formation of the top frame D. It will be seen by inspecting Figs. 4 and 8 that the various sections of this top frame have the following formation in cross section. The base of each frame section is of L-formation and includes the side wall engaging branch 30 with the right angularly arranged ceiling engaging branch 31. A convexo-concave section 32 is formed integrally with the outer edge of the ceiling engaging branch 31. Attached to the free edge of the convexo-concave strip 32 is a channel-shaped portion 33. It will be noted that the base 33' of this channel formation 33 is spaced from and arranged in parallelism with the ceiling engaging branch 31. The inner side wall of the channel formation 33 is spaced from and arranged in parallelism with the side wall engaging branch 30 of the strip. This spacing of the base 33' and the inner side wall of the channel formation 33 provides a bore 34 and a connected channel 35, the utility of which will be described at a later point.

Figures 3, 4:
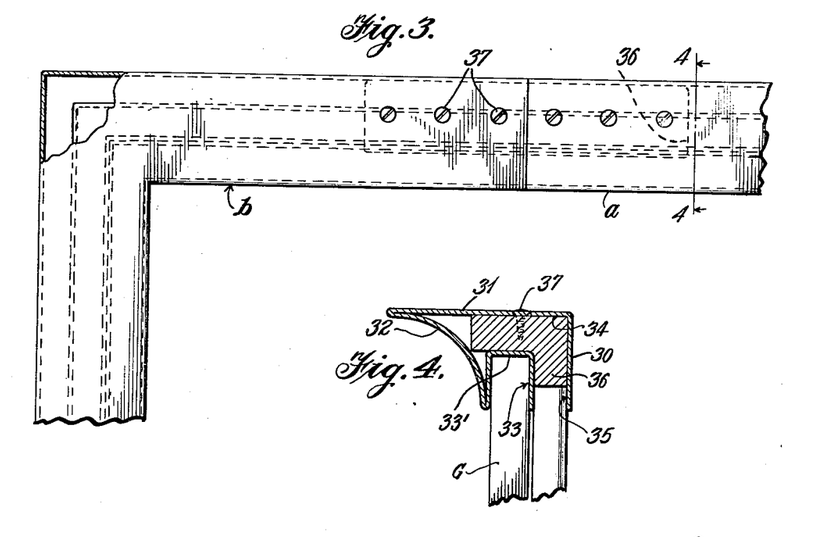
Figure 3 is a fragmentary top plan view of a portion of a top frame structure embodying this invention.
Figure 4 is a vertical sectional view taken on line 4—4 of Fig. 3.
Figures 5, 6, 7:
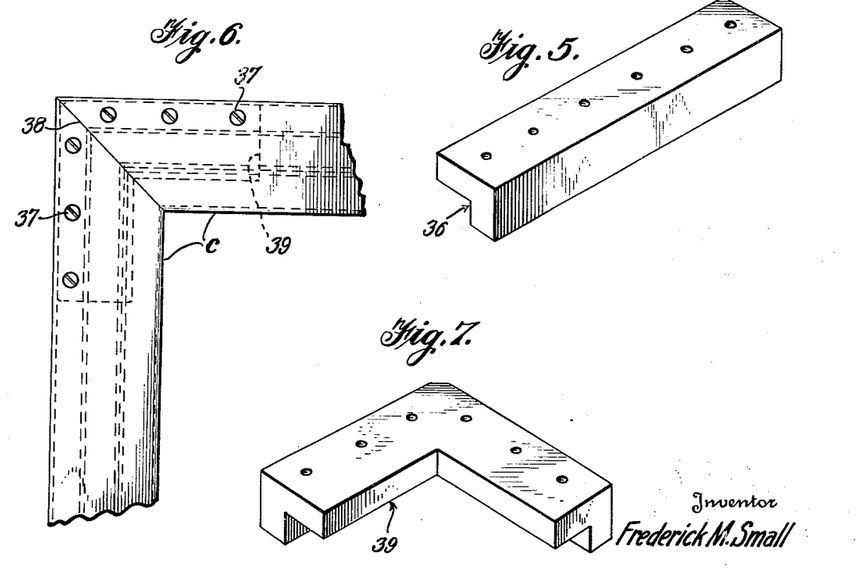
Figure 5 is a perspective view of a form of splicing member illustrated in Figs. 3 and 4.
Figure 6 is a top plan view of a corner portion of a top frame but showing a slightly modified form of joint than that disclosed in Fig. 3.
Figure 7 is a perspective view of the form of splicing element disclosed in Fig. 6.
Figures 8, 9, 10:
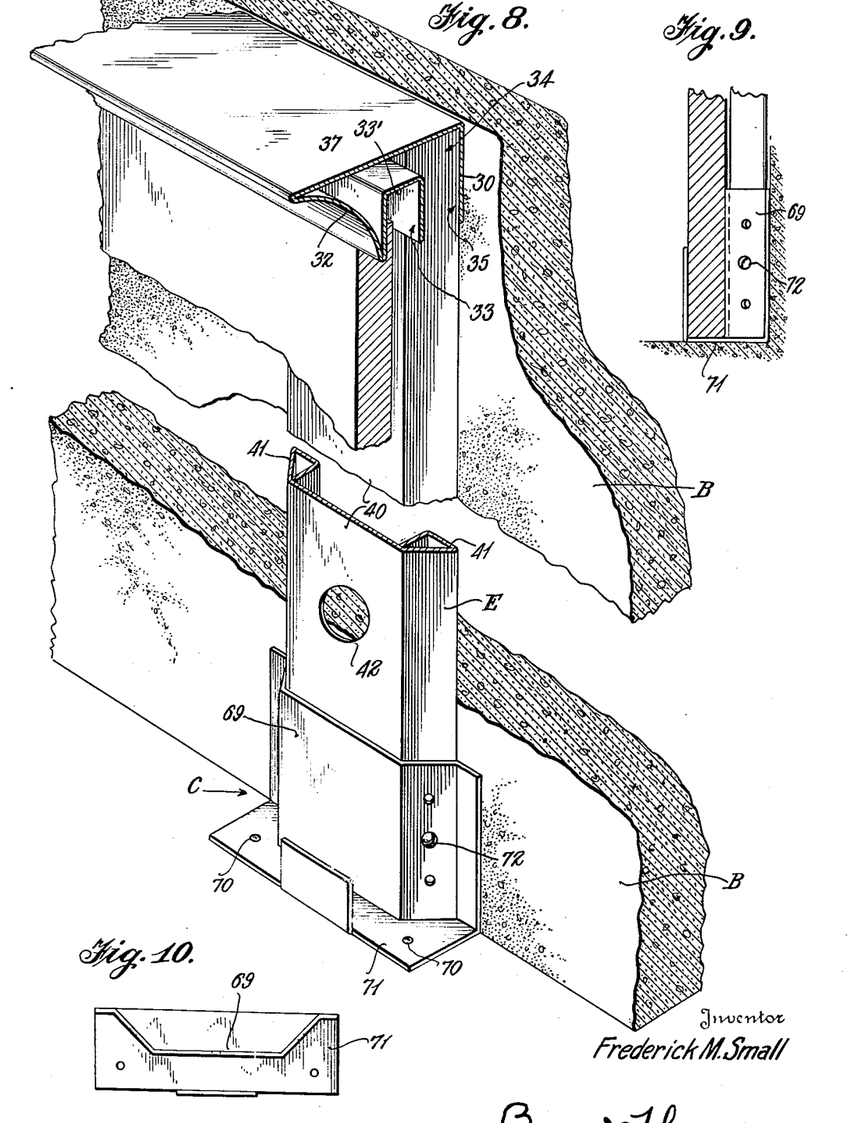
Figure 8 is a fragmentary perspective view of one form of interior paneling embodying this invention.
Figure 9 is a side elevational view of an anchor bracket disclosed in Fig. 8.
Figure 10 is a top plan view of the anchor bracket disclosed in Fig. 9.

In fabricating a top frame D from a plurality of sections of channeled material of the formation disclosed in Figs. 4 and 8, the necessary number of straight frame sections may be provided for taking care of the various side walls of the room. Inside corner angles may be formed as shown in Fig. 3 or as shown in Fig. 6. In Fig. 3, a straight frame section $a$ is spliced at its end to an angle section $b$ by means of a substantially L-shaped splicing member 36, disclosed in detail in Fig. 5. Screws 37 may be employed for securing the adjacent ends of the sections $a$ and $b$ to the splicing member 36. In Fig. 6, an inside corner angle is formed by mitering the adjacent ends of two straight sections $c$, as at 38. These two mitered ends are connected by means of the angle splice member 39 disclosed in detail in Fig. 7. This splice member is of L-formation in section and has the two frame sections $c$ attached thereto by means of screws 37.

This fabricated top frame D, as shown in Fig. 1, occupies the angle formed by the ceiling A and side wall B. The frame is not to be attached in any way to the ceiling or the side wall, but is to be supported solely by a desired number of furring studs or strips E. The various sections of the frame D may be formed from sheet metal of sufficient gauge to prevent the frame from buckling or pulling away from the side wall at points intermediate the corners of the room. It has been discovered, however, that the frame D may be formed of sections made from sheet steel of very thin gauge, such as No. 26, if the straight sections of the frame are bowed lengthwise and applied to the side walls with their convex sides presented to the walls. Preferably, the straight sections are non-uniformly bowed lengthwise with the central portions of each section curved on a radius which is less than the radii of curvature of the end portions. By forcing these longitudinally bowed top frame sections flatly against the side walls of the room, and by connecting the ends of the sections to sections extending along right angularly arranged side walls of the room, the central portions of the top frame sections will tightly hug the side walls and will resist any forces tending to pull the sections away from said side walls. Due to the resiliency of the frame sections the frame D may be readily assembled in the room below the ceiling, as for example, in a diagonal position, and then pushed upwardly into position adjacent the ceiling.

Figure 2:
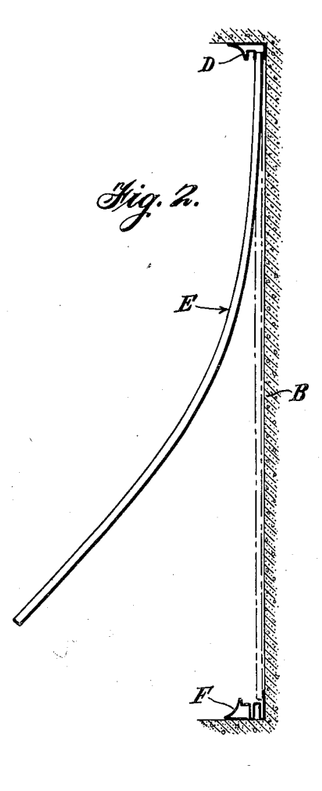
Figure 2 is a side elevational view of a furring stud or strip being applied to a side wall of a room in accordance with this invention.

The type of furring stud or strip E employed by me in my paneling system is disclosed and claimed in my copending application Ser. No. 106,210, filed October 17, 1936, and entitled, "Furring stud or strip". This furring stud or strip is best illustrated in Figs. 1, 2, 8, 11, 14, 16 and 17, but the structural features of the same will be described by referring to Figs. 2 and 8 only. Each strip consists of a substantially flat body portion 40 which is provided at both longitudinal edges with triangularly shaped, hollow, reinforcing flanges 41. Each furring stud or strip is bowed longitudinally, as best illustrated in Fig. 2, and is applied to a side wall B by having its upper end inserted into the inner channel 35 of the top frame D. This top frame restrains the upper end of the furring stud or strip E from pulling away from the side wall B. By forcing the lower end of the furring stud or strip E against the side wall B, the said stud or strip will be placed under compression or will be distorted out of its normal shape so that intending to return to its initial bowed condition, it will constantly exert forces inwardly against the side wall throughout its length and outwardly at its ends against the top frame D and bottom frame F. As described in my aforementioned copending application, the furring strip E preferably is non-uniformly bowed throughout its length. I have determined that by curving the central portion of each furring stud or strip about a radius which is less than the radii of curvature of the end sections of the strip, the central portion of the strip will hug the side wall as tightly as the end portions and will resist being pulled away from the side wall B to a sufficient extent to enable it to support the weight of panel units G which are attached to the strips.

Figures 11, 12, 13:
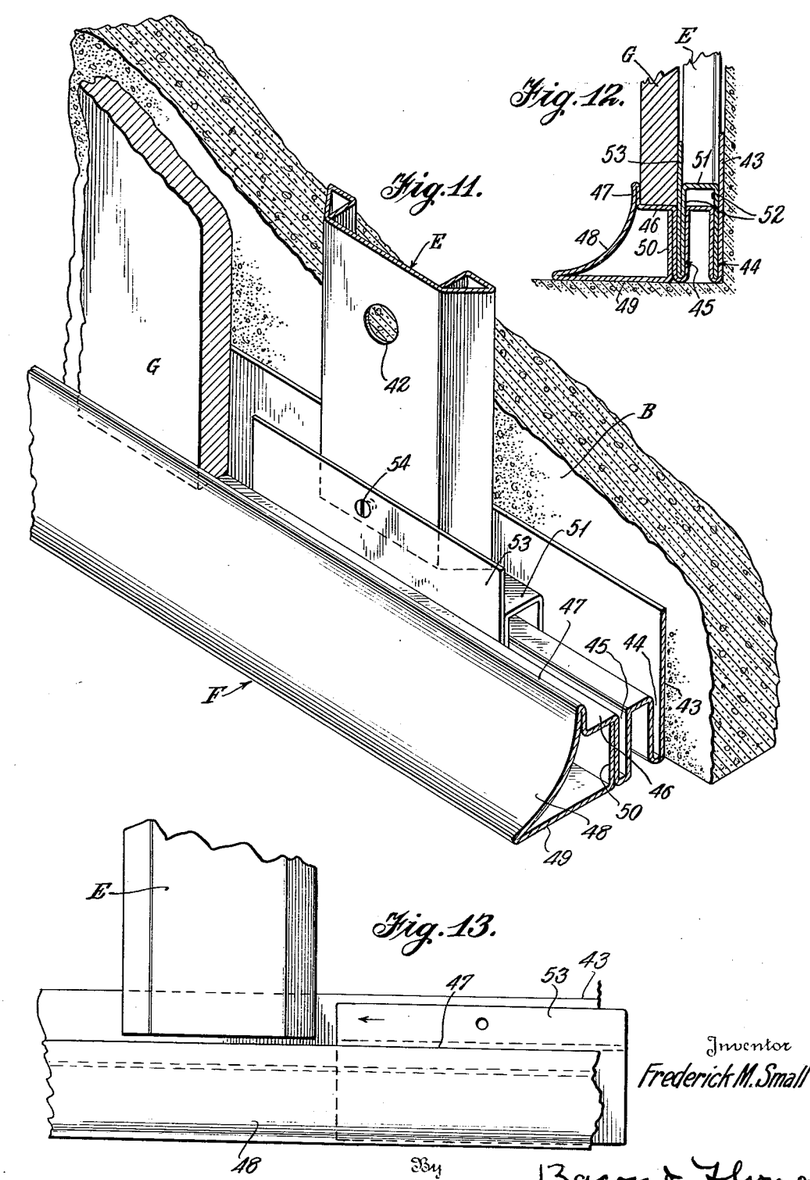
Figure 11 is a fragmentary perspective view of a modified form of securing device for the lower ends of furring strips.
Figure 12 is a fragmentary vertical sectional view of the structure disclosed in Fig. 11.
Figure 13 is a fragmentary front elevational view of the structure disclosed in Figs. 11 and 12 and illustrating a method of assembly of such structure.

As shown in Figs. 8 and 11, the lower end portion of each furring strip E is provided with an aperture 42 which will be employed in a manner to be described at a later point.

The bottom frame F is structurally disclosed in Figs. 11 to 13, inclusive. This frame is to be formed from thin gauge sheet steel in any desired manner. It includes a side wall engaging branch 43, two parallel channels 44 and 45, a shelf 46 with an upstanding flange 47 at the outer margin of the shelf, a convexo-concave section 48 extending from the flange 47 to the floor line, a base section 49 extending inwardly from the lower edge of the convexo-concave section 48, and an upstanding flange 50 at the inner edge of the section 49 and lying flatly against the outer wall of the channel 45 with its upper edge underlying and reinforcing the shelf 46. The frame F, like the frame D, may be formed from a plurality of straight frame sections and may be assembled in the room in a similar manner.

The frame F is employed for restraining the lower end of the studs or strips E against movement away from the side wall D. If desired, the frame F may be anchored to the floor. It has been determined, however, that no anchorage to the floor need be provided for the frame F if the following procedure is adopted.

After the upper end of a furring strip is inserted in the channel 35 of the top frame D, and straightened out against the side wall B, the lower end of the furring stud or strip may be restrained against outward movement by means of an h-shaped locking key 51. Figs. 11 and 12 show this locking key 51 as having two parallel legs 52 which are inserted in the parallel channels 44 and 45 of the frame F. The locking key also has an upstanding arm 53. By inserting the legs 52 into the channels 44 and 45, while the key is located laterally of the lower end of the furring stud or strip E and then sliding the said locking key 51 laterally of the frame F until it is located centrally with respect to the lower end of the stud or strip E, the upstanding arm 53 will overlap the lower end of the stud or strip E to prevent this lower end from pulling away from the side wall B.

A jack, not shown, with a specially formed head having a laterally projecting pin, or the like, insertable in the aperture 42 of the furring stud or strip E may be employed for jacking up the stud or strip to place the same under longitudinal compression. While the furring stud or strip is held under longitudinal compression by means of a jack, a self-threading screw 54 may be threaded on the upstanding arm 53 of the key 51 and the lower end of the furring stud or strip E. This connection between the furring strip and the frame F will hold the furring strip in its compressed condition so that the jack may be disconnected therefrom. It now will be appreciated that the top frame D and the bottom frame F will be forcibly held against the ceiling and floor respectively by the furring strip E and its connection with the locking key 51. The top and bottom frames D and F, therefore, will need no anchor means for holding the same in place in the angles formed by the ceiling and side walls in one instance and the side wall and floor in the other instance.

Figures 14, 15:
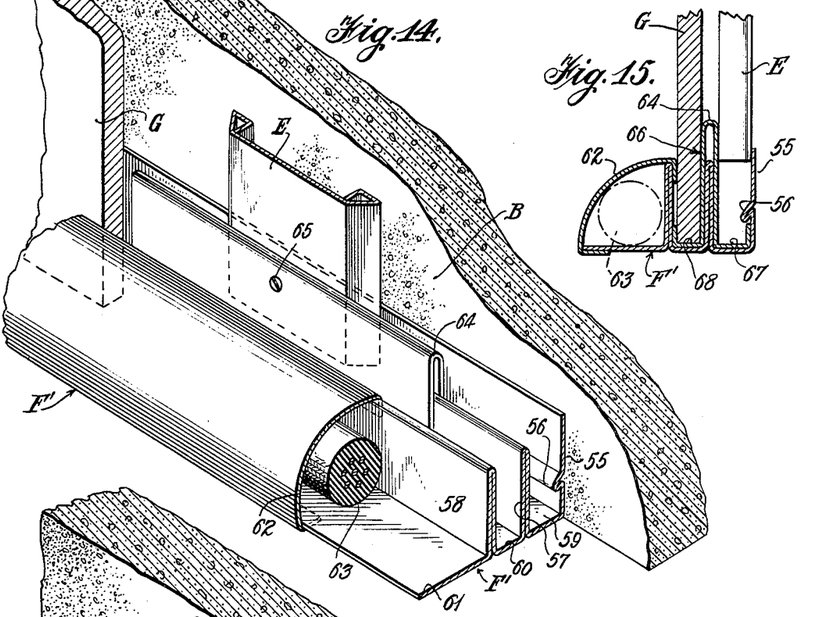

Figs. 14 and 15 disclose a slightly modified form of bottom frame F'. This frame includes a rear section 55 which is adapted to engage the side wall B. This rear section is provided with a longitudinally extending bead 56 which projects laterally and downwardly from the section 55. Spaced outwardly of the rear section 55 are two parallel flanges 57 and 58 which cooperate with each other and with the rear section 55 to form two channels 59 and 60. The material of the frame outwardly of the flange 58 is shaped to form a base strip 61. By covering the space formed between the flange 58 and the base strip 61 by means of the cover strip 62, a conduit for electric wires 63 is provided in the base strip.

The furring stud or strip E, shown in Fig. 14, after being flattened against the side wall B and longitudinally compressed by means of a jack, as described in connection with Fig. 11, may be anchored to the bottom frame F' by means of a locking key 64 and a screw 65, in the manner shown. This locking key 64 is bent upon itself to form the upstanding branch 66 which straddles the flange 57 of the bottom frame F'. The bottom edges of the branch 66 are bent outwardly and upwardly to form the angle base flanges 67 and 68. The upstanding edge of the angle flange 67 hooks under the bead 56 formed in the rear flange 55 of the bottom frame F'. The manner of applying the locking key 64 to the bottom frame F' and the furring stud or strip E is the same as that described in connection with the locking key 51 disclosed in Figs. 11 to 13, inclusive.

Figs. 8 to 10, inclusive, disclose a modified form of anchorage for the lower ends of the furring strips. This anchorage consists of an upstanding channel portion 69 which is placed against the lower end of a furring stud or strip after the latter has been straightened out against the side wall B. For the purpose of holding the channel 69 against the lower end of the furring strip and the said strip against the wall B, screws 70 may be driven through a base flange 71 formed on the channel 69 and into the floor C. A suitable jack then should be connected to the furring stud or strip E for placing the latter under longitudinal compression. While the furring stud or strip is held under such compression, a desired number of self-threading screws 72 may be driven through the opposite side walls of the channel 69 and the opposite side flanges 41 of the furring stud or strip E. This connection between the furring stud or strip and the anchorage will hold the furring stud or strip under longitudinal compression to permit the jack to be disconnected therefrom.

Figure 16:
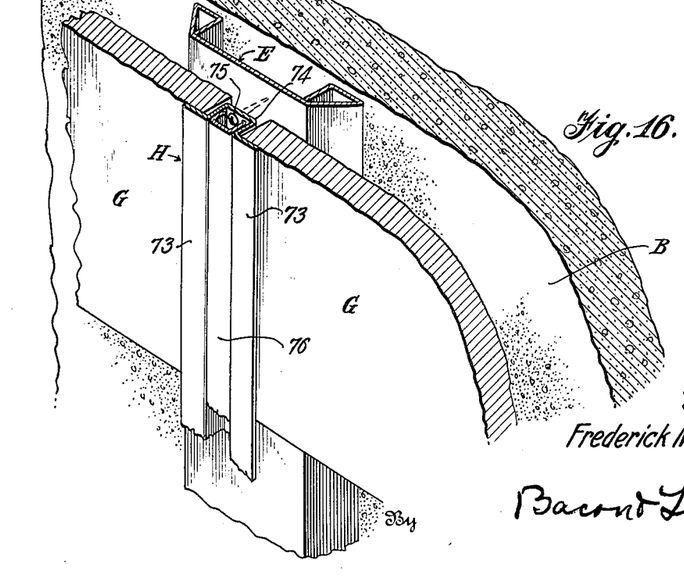
Figure 16 is a fragmentary perspective view disclosing means for attaching panel units to furring studs or strips.

Fig. 16 discloses one manner in which the panel units G may be attached to the furring studs or strips E. It is to be understood that these panel units may be of any desired construction. They may, if desired, consist of sheets of any desired form of insulating material, glass, or compositions of plastics. I do not desire to be limited in any respect as to construction of the panel units to be used in this system.

In Fig. 16, two adjacent vertical edges of the panel units G are arranged in spaced relation and overlying a furring stud or strip E. A channel-shaped moulding device H is then applied against outer faces of the panel units G with the lateral wings 73 of the moulding overlying the panel units. The channel-shaped central portion 74 of the moulding will be located between the adjacent edges of the panels. By driving self-threading screws 75 through the channel 74 into the furring stud or strip E, the edges of the panel units may be tightly clamped against the furring stud or strip. To conceal the heads of the screws 75, a filler strip 76 may be driven into the throat of the channel 74 to be frictionally retained therein.

Figures 17, 18, 19:
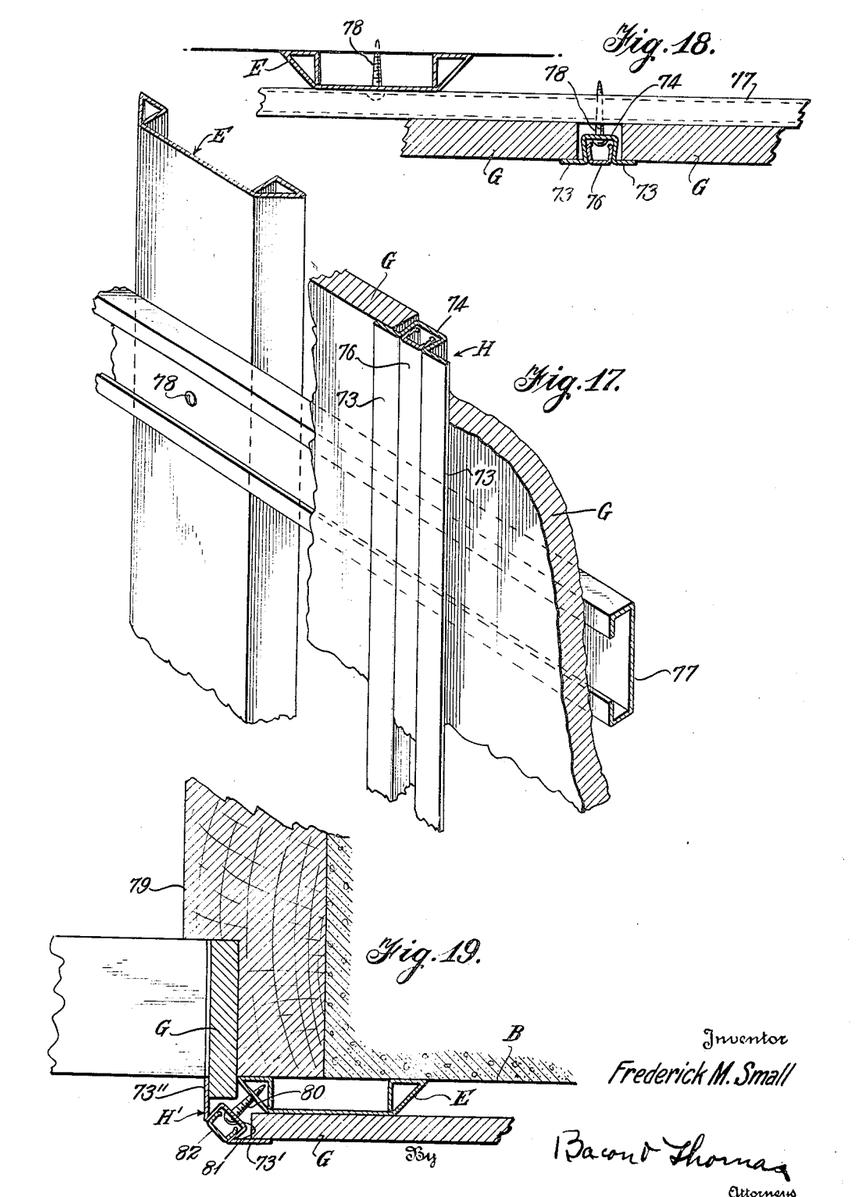
Figure 17 is a similar view to Fig. 16 but illustrating a further form of panel unit attaching means.
Figure 18 is a horizontal sectional view of the mechanism disclosed in Fig. 17.
Figure 19 is a horizontal sectional view of a fragmentary portion of a door frame and the adjacent side wall with means employed for applying paneling thereto.

Figs. 17 and 18 disclose a manner of attaching panel units G to furring studs or strips E where the joint between adjacent edges of the panel units does not occur at a furring stud or strip. This may be accomplished by connecting to the furring studs or strips E a desired number of horizontally extending, sheet metal channels 77 by means of self-threading screws 78. The moulding devices H, described in detail in connection with Fig. 16, then may be applied to the adjacent edges of the panel units G and attached to the channels 77 by self-threading screws 78, in the manner best illustrated in Fig. 18. The same reference characters employed in Fig. 16 for describing the moulding devices H will be applied to the moulding in Figs. 17 and 18.

Fig. 19 discloses one method I have developed for paneling around a door or window opening. In this figure, the door or window frame is designated by the reference character 79. A furring stud or strip E is located so that one longitudinal edge flange aligns with each marginal edge of each inner face of the frame 79. Panel units may be positioned as shown in this figure and held in place by the moulding devices H'. This moulding device includes a narrow wing 73' which engages the edge of the panel unit G that overlies the side wall B. A second, relatively wide wing 73'' is formed on the other side of the moulding device H' and overlies the small panel unit G which is applied to the inner face of the frame 79. Self-threading screws 80 may be employed for connecting the channel-shaped portion 81 of the moulding device to the furring stud or strip E. A filler strip 82 may be driven into the throat of the moulding device H' for concealing the heads of the screws 80.

Figure 20:
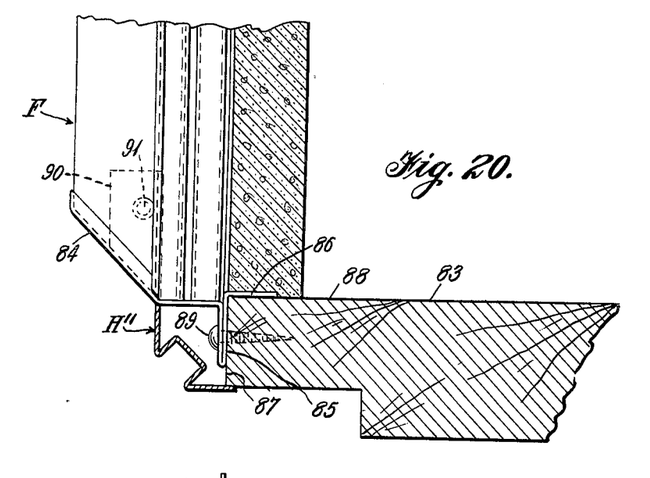
Figure 20 is a similar view to Figure 19 but disclosing a form of cap mechanism for covering the end of the bottom frame structure at a door opening.
Figure 21:
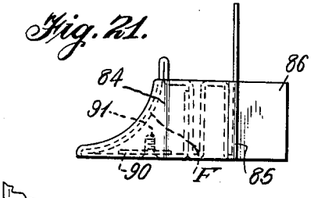
Figure 21 is an elevational view of a portion of the mechanism disclosed in Fig. 20 and looking in the direction of the said wall paneling.
Figure 22:
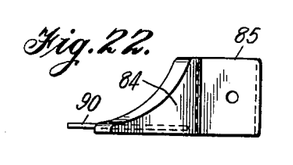
Figure 22 is an elevational view of the mechanism disclosed in Fig. 21 but taken at right angles thereto.

Figs. 20 to 22, inclusive, disclose one form of cap which may be employed for covering the end of the bottom frame structure F disclosed in Figs. 11 to 13, inclusive, at a door opening. In Fig. 20, the door frame is designated by the reference character 83. The bottom frame F will be given the same reference characters as those employed in Figs. 11 to 13, inclusive. The various structural features of this bottom frame will not be repeated at this time. The cap includes a flanged portion 84 which will overlie the end edges of the sections 48 to 50, inclusive, of the bottom frame as well as the ends of the channels 44 and 45. The cap portion 84 is provided with right angularly arranged flange portions 85 and 86 which will bear against the end face 87 and the side face 88, respectively, of the door frame 83. A screw 89 will be driven through the flange 85 of the cap into the wooden frame 83. A moulding device H'' will be employed for concealing the securing screw 89, in the manner illustrated. For the purpose of connecting the cap to the bottom frame member F, a tongue 90 projects laterally from the portion 84 of the cap and overlies the base section 49 of the frame F to be secured thereto by means of a screw 91, see Fig. 21.

Figure 23:
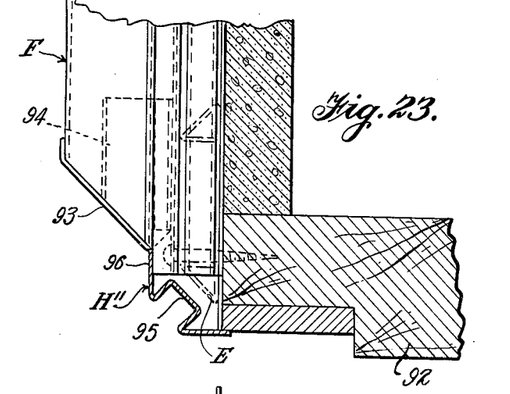
Figure 23 is a similar view to Figures 19 and 20 and discloses another form of cap mechanism for covering the end of the bottom frame structure at a door opening.
Figure 24:
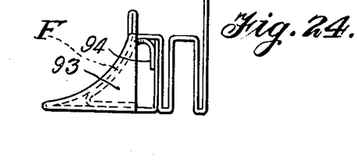
Figure 24 is an elevational view of the mechanism disclosed in Fig. 23 and looking in the direction of the paneling.
Figure 25:
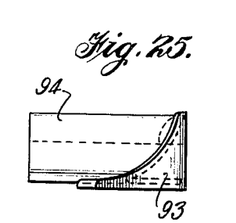
Figure 25 is an elevational view of the mechanism disclosed in Fig. 24.

In Figs. 23 to 25, inclusive, there is disclosed a modified form of cap for finishing off the end of a bottom frame member at a door opening. In Fig. 23, the frame for the door opening is designated by the reference character 92. The frame F has applied thereto the reference characters employed in Figs. 11 to 13, inclusive. Fig. 23 also discloses a furring stud or strip E as being positioned to overlie the outer edge of the door frame 92. The cap structure includes a cover section 93 which is provided with a tongue 94 insertable in the space formed by the sections 48 to 50, inclusive, of the bottom frame F. A moulding device H'' is applied in the manner illustrated and is held in place by screws, not shown, driven through the channel portion 95 of the moulding. The wing 96 of this moulding device H'' abuts against the cover 93 and prevents the same from becoming separated from the bottom frame F.

Figs. 4 and 8 disclose the fact that the upper ends of the furring studs or strips are inserted in the inner or rear channels 35 of the top frame sections. The outer channels 33 are employed for receiving the top edges of panel units G, in the manner illustrated.

In the form of bottom frame F disclosed in Figs. 11 and 12, the shelf 46 and upstanding flange 47 are illustrated as functioning to receive the bottom edge of the panel units G. In the form of bottom frame F' disclosed in Figs. 14 and 15, the channel 60 is illustrated as functioning to receive the lower edges of the panel units G. The panel G may be cut to slightly less height than the distance between the opposed channel seats in the top and bottom frames and may be conveniently assembled by first inserting the upper panel edge in the top frame channel a sufficient distance to clear the bottom panel edge of the upstanding flange 47 or 62, whereupon the bottom edge of the panel may be dropped into the channel of the lower frame and remain seated therein and held against lateral displacement by the side walls of the opposed upper and lower channels.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. Interior wall paneling of the type described comprising a top frame extending entirely around a room to be paneled and positioned in the angle formed by the ceiling and side walls, a plurality of furring strips overlying the side walls and connected at their upper ends to said top frame for constituting the sole support for said frame, said furring strips being unattached to said side walls, means for holding the lower ends of the said furring strips against said side walls, and panel units attached to said furring strips.

2. Interior wall paneling of the type described comprising a top frame extending entirely around a room to be paneled and positioned in the angle formed by the ceiling and side walls, a plurality of normally, longitudinally bowed furring strips supporting said frame and held against said side walls at their upper ends by said frame with their convex sides presented to said walls, means for holding the lower ends of said furring strips against said side walls, and panel units supported by said furring strips.

3. Interior wall paneling of the type described comprising a top frame extending entirely around a room to be paneled and positioned in the angle formed by the ceiling and side walls, a plurality of normally, longitudinally bowed furring strips held against said side walls at their upper ends by said frame with their convex sides presented to said walls, said furring strips constituting the sole support for said top frame, means for holding the lower ends of said furring strips against said side walls, and panel units supported by said furring strips.

4. Interior wall paneling of the type described comprising a top frame extending entirely around a room to be paneled and positioned in the angle formed by the ceiling and side walls, a plurality of normally, longitudinally bowed furring strips held against said side walls at their upper ends by said frame with their convex sides presented to said walls, said furring strips constituting the sole support for said top frame, independent means for the lower end of each furring strip attached to said strip and to the floor for holding the lower ends of said strips against the side walls, and panel units supported by said furring strips.

5. Interior wall paneling of the type described comprising a top frame extending entirely around a room to be paneled and position in the angle formed by the ceiling and side walls, a plurality of normally, longitudinally bowed furring strips held against said side walls at their upper ends by said frame with their convex sides presented to said walls, said furring strips constituting the sole support for said top frame, a bottom frame positioned in the angle formed by the side walls and the floor, means for attaching the lower ends of all of said furring strips to the bottom frame, and panel units supported by said furring strips.

6. Interior wall paneling of the type described comprising a top frame extending entirely around a room to be paneled and positioned in the angle formed by the ceiling and side walls, a plurality of normally, longitudinally bowed furring strips supporting said frame and held against said side walls at their upper ends by said frame with their convex sides presented to said walls, independent means for the lower end of each furring strip attached to said strip and to the floor for holding the lower ends of said strips against said side walls, and panel units supported by said furring strips.

7. Interior wall paneling of the type described comprising a top frame extending entirely around a room to be paneled and positioned in the angle formed by the ceiling and side walls, a plurality of normally, longitudinally bowed furring strips supporting said frame and held against said side walls at their upper ends by said frame with their convex sides presented to said walls, a bottom frame positioned in the angle formed by the side walls and the floor, means for attaching the lower ends of all of said furring strips to the bottom frame, and panel units supported by said furring strips.

8. Interior wall paneling of the type described comprising a top frame extending entirely around a room to be paneled and positioned in the angle formed by the ceiling and side walls, a plurality of furring strips overlying the side walls and connected at their upper ends to said top frame for constituting the sole support for said frame, said furring strips being unattached to said side walls, means for holding the lower ends of the said furring strips against said side walls, and panel units attached to said furring strips and said top frame.

9. Interior wall paneling of the type described comprising a top frame extending entirely around a room to be paneled and positioned in the angle formed by the ceiling and side walls, a plurality of normally, longitudinally bowed furring strips supporting said frame and held against said side walls at their upper ends by said frame with their convex sides presented to said walls, means for holding the lower ends of said furring strips against said side walls, and panel units supported by said furring strips and said top frame.

10. Interior wall paneling of the type described comprising a top frame extending entirely around a room to be paneled and positioned in the angle formed by the ceiling and side walls, a plurality of normally, longitudinally bowed furring strips held against said side walls at their upper ends by said frame with their convex sides presented to said walls, said furring strips constituting the sole support for said top frame, a bottom frame positioned in the angle formed by the side walls and the floor, means for attaching the lower ends of all of said furring strips to the bottom frame, and panel units supported by said furring strips and said top and bottom frames.

11. Interior wall paneling of the type described comprising a top frame extending entirely around a room to be paneled and positioned in the angle formed by the ceiling and side walls, said top frame consisting of a plurality of channeled sections interconnected at their ends, a plurality of furring strips overlying the side walls and having their upper ends inserted in the channel of the top frame to support the top frame, means for holding the lower ends of said strips against said side walls, and panel units attached to said furring strips.

12. Interior wall paneling of the type described comprising a top frame extending entirely around a room to be paneled and positioned in the angle formed by the ceiling and side walls, said top frame consisting of a plurality of channel-shaped sections interconnected at their ends, a plurality of normally, longitudinally bowed furring strips overlying the side walls and having their upper ends inserted in the channel of the top frame to support the top frame, means for holding the lower ends of said strips against said side walls, and panel units attached to said furring strips.

13. Interior wall paneling of the type described comprising a top frame extending entirely around a room to be paneled and positioned in the angle formed by the ceiling and side walls, said top frame consisting of a plurality of channel-shaped sections interconnected at their ends, a plurality of furring strips overlying the side walls and having their upper ends inserted in the channel of the top frame, said furring strips constituting the sole support for said top frame, means for holding the lower ends of said strips against said side walls, and panel units attached to said furring strips.

14. Interior wall paneling of the type described comprising a top frame extending entirely around a room to be paneled and positioned in the angle formed by the ceiling and side walls, said top frame consisting of a plurality of channel-shaped sections interconnected at their ends, a plurality of normally, longitudinally bowed furring strips overlying the side walls and having their upper ends inserted in the channel of the top frame, said furring strips constituting the sole support for said top frame, means for holding the lower ends of said strips against said side walls, and panel units attached to said furring strips.

15. Interior wall paneling of the type described comprising a top frame extending entirely around a room to be paneled and positioned in the angle formed by the ceiling and side walls, a plurality of normally, non-uniformly, longitudinally bowed furring strips supporting said frame and held against said side walls at their upper ends by said frame with their convex sides presented to said walls, means for holding the lower ends of said furring strips against said side walls, and panel units supported by said furring strips.

16. The method of paneling the side walls of a room comprising positioning a frame extending entirely around a room in the angle formed by the ceiling and side walls, connecting the upper ends of a plurality of furring strips to said frame to support the latter, placing said furring strips under longitudinal compression, supporting said strips from the floor of a room to maintain the strips in their longitudinally compressed conditions, and attaching panel units to said furring strips.

17. The method of paneling the side walls of a room comprising positioning a frame extending entirely around a room in the angle formed by the ceiling and side walls, connecting the upper ends of a plurality of furring strips to said frame for supporting the latter, applying a longitudinally directed jacking-up force to the lower ends of said furring strips to place said strips under longitudinal compression, interpositioning a support between the lower ends of said furring strips and the floor to maintain said strips under compression, and attaching panel units to said strips.

18. The method of paneling the side walls of a room comprising positioning a frame extending entirely around a room in the angle formed by the ceiling and side walls, connecting the upper ends of a plurality of longitudinally bowed furring strips to said frame to support the latter with the convex sides of said strips presented to the side walls, forcing the lower ends of said strips against the side walls to cause the distorted strips to tightly hug the said walls, anchoring the lower ends of the strips to the floor, and attaching paneling units to said strips.

19. The method of paneling the side walls of a room comprising positioning a frame extending entirely around a room in the angle formed by the ceiling and side walls, connecting the upper ends of a plurality of non-uniformly, longitudinally bowed furring strips to the frame to support the latter with the convex sides of said strips presented to the side walls, forcing the lower ends of said strips against the side walls to cause the distorted strips to tightly hug the said walls, anchoring the lower ends of said strips to the floor, and attaching panel units to said strips.

20. The method of paneling the side walls of a room comprising positioning a frame extending entirely around a room in the angle formed by the ceiling and side walls, connecting the upper ends of a plurality of non-uniformly, longitudinally bowed furring strips to the frame with the convex sides of said strips presented to the side walls, forcing the lower ends of said strips against the side walls to cause the distorted strips to tightly hug the said walls, restraining the lower ends of said strips against movement away from said walls, applying a longitudinally directed jacking-up force to the lower ends of said strips to place said strips under compression, anchoring said strips at their lower ends to retain them under longitudinal compression, and attaching the panel units to said strips.

FREDERICK M. SMALL.